(12) United States Patent
Yoshioka

(10) Patent No.: US 6,704,583 B1
(45) Date of Patent: Mar. 9, 2004

(54) MOBILE TELEPHONE AND METHOD OF OPERATING THE SAME

(75) Inventor: Kenji Yoshioka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/569,559

(22) Filed: May 12, 2000

(30) Foreign Application Priority Data

May 18, 1999 (JP) .......................................... 11-136828

(51) Int. Cl.$^7$ ................................................ H04B 1/38
(52) U.S. Cl. .................... 455/574; 455/567; 455/343.2; 455/343.3
(58) Field of Search ........................ 340/636.1, 636.12, 340/636.15, 636.19; 455/414.1, 415, 424, 343.3, 343.2, 406, 564, 574, 567

(56) References Cited

U.S. PATENT DOCUMENTS

| | | | |
|---|---|---|---|
| 5,278,995 A | | 1/1994 | Hwang |
| 5,526,398 A | | 6/1996 | Okada et al. |
| 5,737,707 A | | 4/1998 | Gaulke et al. |
| 5,781,621 A | * | 7/1998 | Lim et al. ............... 379/142.04 |
| 5,905,965 A | * | 5/1999 | Asano et al. ................ 455/574 |
| 5,936,534 A | * | 8/1999 | Yokota ..................... 340/636.1 |
| 5,987,310 A | * | 11/1999 | Gray ........................ 455/575.6 |
| 6,144,840 A | * | 11/2000 | Alton et al. .............. 455/343.3 |
| 6,236,326 B1 | * | 5/2001 | Murphy .................... 340/636.1 |
| 6,298,122 B1 | * | 10/2001 | Horne ..................... 379/93.09 |
| 6,408,172 B1 | * | 6/2002 | Alperovich et al. ...... 455/404.1 |
| 6,411,197 B1 | * | 6/2002 | Morita ..................... 340/7.35 |

FOREIGN PATENT DOCUMENTS

| | | | |
|---|---|---|---|
| EP | 0 650 306 A1 | 10/1993 | |
| GB | 2 230 162 A | 10/1990 | |
| JP | 4-321323 | 11/1992 | |
| JP | 5-91018 | 4/1993 | |
| JP | 7-162955 | 6/1995 | |
| JP | 10-209953 | 8/1998 | |
| JP | 2000278754 A | * 10/2000 | ............ H04Q/7/38 |

* cited by examiner

*Primary Examiner*—William Trost
*Assistant Examiner*—Marcos Torres
(74) *Attorney, Agent, or Firm*—Scully, Scott, Murphy & Presser (57) ABSTRACT

There is provided a mobile telephone including (a) an antenna receiving radio signals, (b) a display screen, (c) a voltage source, (d) a memory storing telephone numbers therein, (e) an interface through which an operator can set a low-voltage mode in which the mobile telephone is allowed to receive a call associated with predetermined telephone numbers, even if a voltage supplied by the voltage source is equal to or lower than a predetermined threshold voltage, and (f) a controller detecting a telephone number out of a radio signal received through the antenna, comparing the thus detected telephone number to the telephone numbers stored in the memory, and determining whether a call associated with the detected telephone number is to be received, when the mobile telephone is set in the low-voltage mode. The provided mobile telephone makes it possible to receive a call in a predetermined telephone number, even if a voltage supplied from a voltage source is lower than a predetermined threshold voltage.

28 Claims, 10 Drawing Sheets

THIRD NORMAL LEVEL

FIG. 3B

SECOND NORMAL LEVEL

FIG. 3C

FIRST NORMAL LEVEL

FIG. 3D

LOW-VOLTAGE ALARM

MOBILE TELEPHONE AND METHOD OF OPERATING THE SAME

BACKGROUND OF THE INVENTION

1. Field of the Invention

The invention relates to a mobile telephone and a method of operating the same, and more particularly to a mobile telephone and a method of operating the same both of which make it possible to receive a call, even when a source voltage is lowered.

2. Description of the Related Art

Since a mobile telephone such as a cellular phone is always carried a user, a mobile telephone is designed to include a rechargeable cell, and receive power from the cell.

Such a mobile telephone is usually designed to include a man machine interface (MMI) to show a user residual power of the cell. A mobile telephone is generally designed to display residual power in a display screen with an eye-con.

A mobile telephone is guaranteed to properly operate only in a specific range of a voltage. A mobile telephone usually has upper and lower threshold voltages, and checks residual power between those threshold voltages. The lower threshold voltage is more important than the upper threshold voltage, because if a source voltage becomes lower than the lower threshold voltage, power supplied from a power source will be soon exhausted. Hence, a mobile telephone is usually designed to include an alarm to annunciate a user that a source voltage has become lower than a lower threshold voltage. Such an alarm is comprised of an indication in a display screen or ringing, for instance. Hereinbelow, such an alarm is referred to as a low-voltage alarm.

As is obvious in view of the above, when the low-voltage alarm is made, it is necessary for the above-mentioned mobile telephone to replace the cell with a new one, to supply power to the cell from an external source, or charge the cell. Otherwise, the mobile telephone could not properly operate.

If the mobile telephone is used when a source voltage is lowered in the vicinity of the lower threshold voltage, current consumption is much increased. As a result, the low-voltage alarm may be made even if the mobile telephone is used not so much.

A mobile telephone consumes a current to the greatest degree in call-receiving, call-transmitting and communication. Hence, if communication is made for long time while a source voltage is in the vicinity of the lower threshold voltage, the low-voltage may be made during the communication, or the communication may be compulsively interrupted. Even if communication were made for short time, repetition of such communication would cause the low-voltage alarm much earlier than a stand-by mode in which a mobile telephone is turned on, but communication is not made in the mobile telephone.

Hence, if a source voltage is lowered in the vicinity of the lower threshold voltage, an important call may not be able to be received.

Many attempts have been made to solve the above-mentioned problem.

For instance, Japanese Unexamined Patent Publication No. 4-321323 has suggested a mobile radio-signal transceiver. In the suggested mobile radio-signal transceiver, if a voltage of a cell is detected to have lowered to a predetermined voltage, call-receiving, call-transmitting and communication are all prohibited. By turning an external switch on, the mobile radio-signal transceiver can carry out to receive a call, transmit a call and make communication therethrough again. Then, if a voltage of a cell is detected to have lowered to a predetermined minimum voltage, call-receiving, call-transmitting and communication are all prohibited again.

Japanese Unexamined Patent Publication No. 5-91018 has suggested a mobile telephone designed to be able to receive a call during a predetermined period of time. Specifically, the suggested mobile telephone is comprised of a timer for measuring the lapse of a predetermined period of time, a key through which operation of the timer is controlled, and a switching transistor controlling a power supply to supply electric power to a radio-signal receiver until the predetermined period of time has passed after the timer 8 had started.

Japanese Unexamined Patent Publication No. 7-162955 has suggested a cellular phone which is capable of annunciating a user a time during which the user can make communication through the cellular phone, based on residual power of a cell. Japanese Unexamined Patent Publication No. 10-209953 has suggested a cellular phone which is capable of lengthening a lifetime of a cell. Specifically, call-transmitting and/or call-receiving are(is) selected in accordance with residual power of a cell. When a cell has much residual power, both of call-transmitting and call-receiving are carried out, and a cycle for intermittently receiving a radio-signal is set equal to a normal cycle. When a cell has intermediate residual power, only call-receiving is carried out, and a cycle for intermittently receiving a radio-signal is set slightly longer than the normal cycle. When a cell has small residual power, neither call-receiving nor call-transmitting are carried out, but the fact that there has been a call is merely recorded, and a cycle for intermittently receiving a radio-signal is set much longer than the normal cycle.

However, the above-mentioned problem remains unsolved even in the above-mentioned Publications.

SUMMARY OF THE INVENTION

In view of the above-mentioned problem, it is an object of the present invention to provide a mobile telephone and a method of operating the same both of which are capable of receiving an important call with a predetermined telephone number, even when a source voltage is lowered to a lower threshold voltage.

In one aspect of the present invention, there is provided a mobile telephone including (a) an antenna receiving radio signals, (b) a display screen, (c) voltage source, (d) a memory storing telephone numbers therein, and (e) a controller detecting a telephone number out of a radio signal received through the antenna, comparing the thus detected telephone number to the telephone numbers stored in the memory, and determining whether a call associated with the detected telephone number is to be received, even when a voltage supplied by the voltage source is equal to or lower than a predetermined threshold voltage.

It is preferable that the controller detects a voltage supplied by the voltage source at an every predetermined period of time, and displays a present voltage in the display screen.

It is preferable that the controller receives a call, when the call is of one of predetermined telephone numbers, even if a voltage supplied by the voltage source is equal to or lower than a predetermined threshold voltage.

It is preferable that the controller includes first to N-th predetermined threshold voltages to each of which a telephone number detected out of a received radio signal is compared, wherein N is an integer equal to or greater than 2, the memory storing N groups of telephone numbers in association with each of the first to N-th predetermined threshold voltages, the controller receiving a call, if a voltage supplied from the voltage source is equal to or smaller than the M-th predetermined threshold voltage and a telephone number detected out of a received radio signal belongs to M-th group of telephone numbers, wherein M is an integer between 1 and N both inclusive ($1 \leq M \leq N$).

It is preferable that the memory stores the numbers of call-receiving and call-transmitting, and the controller determines whether a call associated with the telephone number detected out of a received radio signal is to be received, based on at least one of the numbers of call-receiving and call-transmitting.

For instance, the memory stores a count X defined by the following equation:

$$X = S \times A + R \times B$$

wherein A indicates the number of call-receiving, B indicates the number of all-transmitting, and S and R are weight coefficients, the controller determines whether a call associated with the telephone number detected out of a received radio signal is to be received, based on the count X.

It is preferable that the memory stores a total period of time during which a call is received or made, for each one of telephone numbers stored therein, and the controller determines whether a call associated with the telephone number detected out of a received radio signal is to be received, based on the total period of time.

There is further provided a mobile telephone including (a) an antenna receiving radio signals, (b) a display screen, (c) a voltage source, (d) a memory storing telephone numbers therein, (e) an interface through which an operator can set a low-voltage mode in which the mobile telephone is allowed to receive a call associated with predetermined telephone numbers, even if a voltage supplied by the voltage source is equal to or lower than a predetermined threshold voltage, and (f) a controller detecting a telephone number out of a radio signal received through the antenna, comparing the thus detected telephone number to the telephone numbers stored in the memory, and determining whether a call associated with the detected telephone number is to be received, when the mobile telephone is set in the low-voltage mode.

It is preferable that the low-voltage mode is set only when a voltage supplied by the voltage source is equal to or lower than the predetermined threshold voltage.

It is preferable that the controller detects a voltage supplied by the voltage source at an every predetermined period of time, and displays a present voltage in the display screen.

It is preferable that the controller receives a call, if the call is of one of the predetermined telephone numbers.

It is preferable that the controller includes first to N-th predetermined threshold voltages to each of which a telephone number detected out of a received radio signal is compared, wherein N is an integer equal to or greater than 2, the memory storing N groups of telephone numbers in association with each of the first to N-th predetermined threshold voltages, the controller receiving a call, if a voltage supplied from the voltage source is equal to or smaller than the M-th predetermined threshold voltage and a telephone number detected out of a received radio signal belongs to M-th group of telephone numbers, wherein M is an integer between 1 and N both inclusive ($1 \leq M \leq N$).

It is preferable that the memory stores the numbers of call-receiving and call-transmitting, and the controller determines whether a call associated with the telephone number detected out of a received radio signal is to be received, based on at least one of the numbers of call-receiving and call-transmitting.

It is preferable that the memory stores a count X defined by the following equation:

$$X = S \times A + R \times B$$

wherein A indicates the number of call-receiving, B indicates the number of call-transmitting, and S and R are weight coefficients, the controller determines whether a call associated with the telephone number detected out of a received radio signal is to be received, based on the count X.

It is preferable that the memory stores a total period of time during which a call is received or made, for each one of telephone numbers stored therein, and the controller determines whether a call associated with the telephone number detected out of a received radio signal is to be received, based on the total period of time.

In another aspect of the present invention, there is provided a method of operating a mobile telephone, including the steps of (a) receiving radio signals through an antenna, (b) storing telephone numbers, (c) detecting a telephone number out of a radio signal received through the antenna, (d) comparing the thus detected telephone number to the stored telephone numbers, and (e) determining whether a call associated with the detected telephone number is to be received, even when a voltage supplied by a voltage source is equal to or lower than a predetermined threshold voltage.

It is preferable that the method further includes the steps of (f) detecting a voltage supplied by the voltage source at an every predetermined period of time, and (g) displaying a present voltage in a display screen.

It is preferable that the method further includes the step of receiving a call, when the call is of one of the stored telephone numbers, even if a voltage supplied by the voltage source is equal to or lower than a predetermined threshold voltage.

It is preferable that the step (d) includes the step of comparing each of first to N-th predetermined threshold voltages to a telephone number detected out of a received radio signal, wherein N is an integer equal to or greater than 2, and further includes the step of receiving a call, if a voltage supplied from the voltage source is equal to or smaller than a M-th predetermined threshold voltage and a telephone number detected out of a received radio signal belongs to the M-th group of telephone numbers, N groups of telephone numbers being in association with each of the first to N-th predetermined threshold voltages, wherein M is an integer between 1 and N both inclusive ($1 \leq M \leq N$).

It is preferable that the method further includes the step of storing the numbers of call-receiving and call-transmitting, and wherein a call associated with the telephone number detected out of a received radio signal is determined in the step (e) to be received or not, based on at least one of the numbers of call-receiving and call-transmitting.

For instance, a call associated with the telephone number detected out of a received radio signal is determined in the step (e) to be received or not, based on a count X defined by the following equation:

$$X = S \times A + R \times B$$

wherein A indicates the number of call-receiving, B indicates the number of call-transmitting, and S and R are weight coefficients.

It is preferable that the method further includes the step of storing a total period of time during which a call is received or made, for each one of telephone numbers stored therein, and wherein a call associated with the telephone number detected out of a received radio signal is determined in the step (e) to be received or not, based on the total period of time.

There is further provided a method of operating a mobile telephone, including the steps of (a) receiving radio signals through an antenna, (b) storing telephone numbers, (c) setting the mobile telephone in a low-voltage mode in which the mobile telephone is allowed to receive a call associated with the stored telephone numbers, even if a voltage supplied by the voltage source is equal to or lower than a predetermined threshold voltage, (d) detecting a telephone number out of a radio signal received through the antenna, (e) comparing the thus detected telephone number to the stored telephone numbers, and (f) determining whether a call associated with the detected telephone number is to be received, when the mobile telephone is set in the low-voltage mode.

It is preferable that the low-voltage mode is set in the step (c) only when a voltage supplied by the voltage source is equal to or lower than the predetermined threshold voltage.

It is preferable that the method further includes the steps of (g) detecting a voltage supplied by the voltage source at an every predetermined period of time, and (h) displaying a present voltage in a display screen.

It is preferable that the method further includes the step of receiving a call, when the call is of one of the stored telephone numbers, even if a voltage supplied by the voltage source is equal to or lower than a predetermined threshold voltage.

It is preferable that the step (e) includes the step of comparing each of first to N-th predetermined threshold voltages to a telephone number detected out of a received radio signal, wherein N is an integer equal to or greater than 2, and further including the step of receiving a call, if a voltage supplied from the voltage source is equal to or smaller than a M-th predetermined threshold voltage and a telephone number detected out of a received radio signal belongs to the M-th group of telephone numbers, N groups of telephone numbers being in association with each of the first to N-th predetermined threshold voltages, wherein M is an integer between 1 and N both inclusive ($1 \leq M \leq N$).

It is preferable that the method further includes the step of storing the numbers of call-receiving and call-transmitting, and wherein a call associated with the telephone number detected out of a received radio signal is determined in the step (f) to be received or not, based on at least one of the numbers of call-receiving and call-transmitting.

For instance, a call associated with the telephone number detected out of a received radio signal is determined in the step (f) to be received or not, based on a count X defined by the following equation:

$$X = S \times A + R \times B$$

wherein A indicates the number of call-receiving, B indicates the number of call-transmitting, and S and R are weight coefficients.

It is preferable that the method further includes the step of storing a total period of time during which a call is received or made, for each one of telephone numbers stored therein, and wherein a call associated with the telephone number detected out of a received radio signal is determined in the step (f) to be received or not, based on the total period of time.

The advantages obtained by the aforementioned present invention will be described hereinbelow.

In the present invention, data indicative of a telephone number of a call transmitter is detected out of a digital signal demodulated by the radio-signal processor when a call has been received, in the low-voltage mode, the detected data is compared to the telephone directory data and the characteristic data, and judgement is made as to whether a call is to be received or not. Hence, even when a source voltage is lowered in the vicinity of a lower threshold voltage, it would be possible to receive a call from a predetermined call-transmitter.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 1:
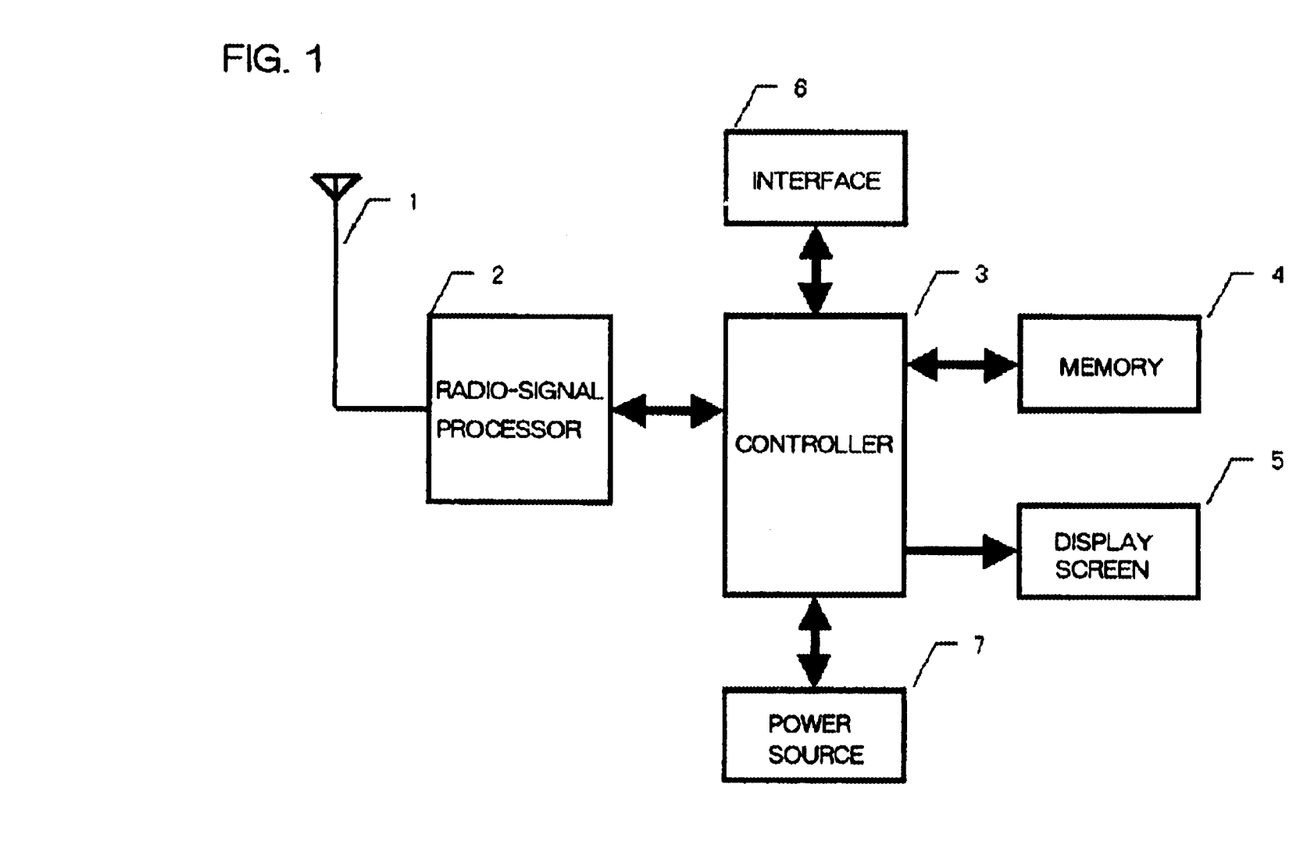
FIG. 1 is a block diagram of a mobile telephone in accordance with the first embodiment.

FIG. 1 is a block diagram of a mobile telephone in accordance with the first embodiment.

With reference to FIG. 1, the mobile telephone in accordance with the first embodiment is comprised of an antenna 1 receiving radio signals, a radio-signal processor 2 converting a frequency of a received high-frequency radio signal, removing noises from the received radio signal, and demodulating the received radio signal, a controller 3, a memory 4 storing both telephone director data and characteristic data, a display screen 5 displaying residual power of a later mentioned power source, a low-voltage alarm, and various data thereon, an interface 6 through which the telephone directory data is referred to and various settings are made, and a power source 7 supplying electric power to the other parts 1 to 6.

The controller 3 detects telephone number data of a call-transmitter out of a digital signal demodulated in the radio-signal processor 2, and converts the thus detected telephone number data into a telephone number of a call-transmitter.

The controller 3 compares the thus obtained telephone number of a call-transmitter to the telephone directory data and the characteristic data both stored in the memory 4, and makes judgement as to whether a call is to be received or not.

In addition, the controller 3 detects a present voltage of the power source 7 at every predetermined period of time, and displays the present voltage on the display screen 5.

An operation of the mobile telephone having the above-mentioned structure is explained hereinbelow.

Figure 2:
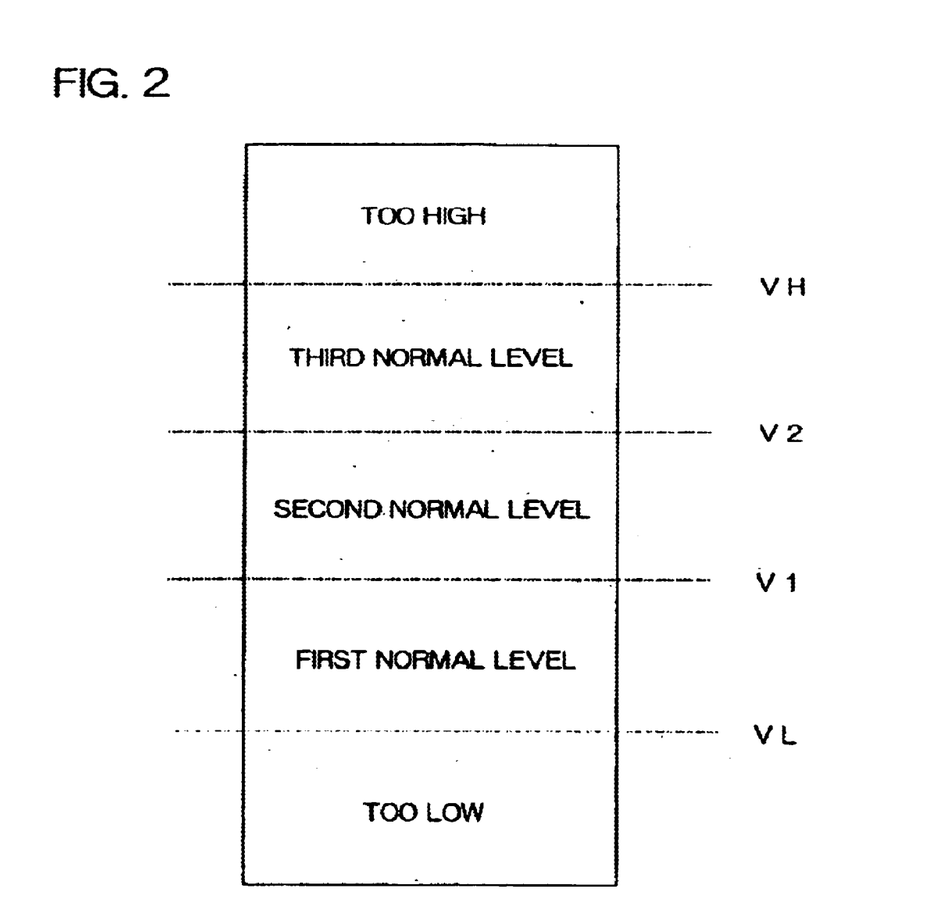
FIG. 2 shows a relation between source voltage levels and threshold voltages.

First, as illustrated in FIG. 2, the controller 3 monitors a voltage of the power source 7 at a predetermined period of time. Then, the controller 3 compares the thus monitored voltage to a predetermined threshold voltage.

The mobile telephone in accordance with the first embodiment properly operates at an operational voltage V in a range of VL to VH. If the operational voltage V is higher than the upper limit VH (V>VH), the operational voltage is too high, resulting in that the mobile telephone cannot be turned on. If the operational voltage V is lower than the upper limit VL (V<VL), the operational voltage is too low, resulting in that the mobile telephone cannot be turned on.

The desired number of threshold voltages may be determined between the upper limit voltage VH and the lower limit voltage VL. In the first embodiment, two threshold voltages V1 and V2 are determined between the voltages VH and VL.

By determining the two threshold voltages V1 and V2, a range of the operational voltage V is divided into three sections. A first section between the voltages VL and V1 defines a first normal level, a second section between the voltages V1 and V2 defines a second normal level, and a third section between the voltages V2 and VH defines a third normal level.

The controller 3 compares the source voltage to the threshold voltages V1 and V2, and displays residual power of the power source 7 in the display screen 5 as illustrated in FIGS. 3A to 3D.

Figure 3A:
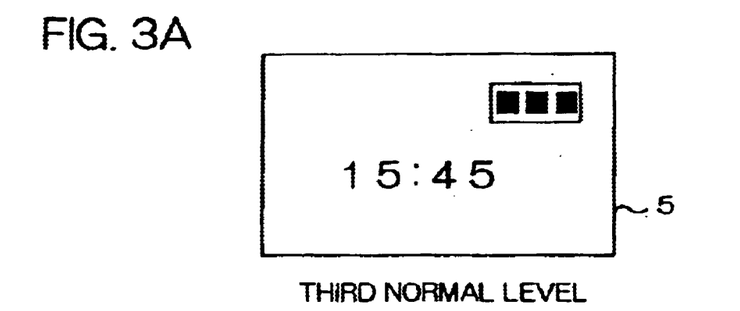
FIGS. 3A to 3D each illustrates a display screen of a mobile telephone, displaying residual power of a cell.
Figure 3B:
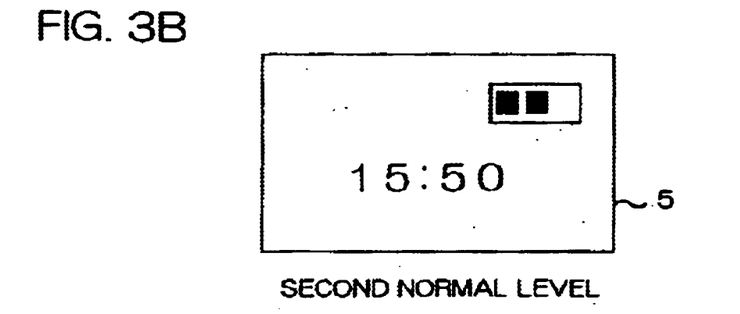
Figure 3C:
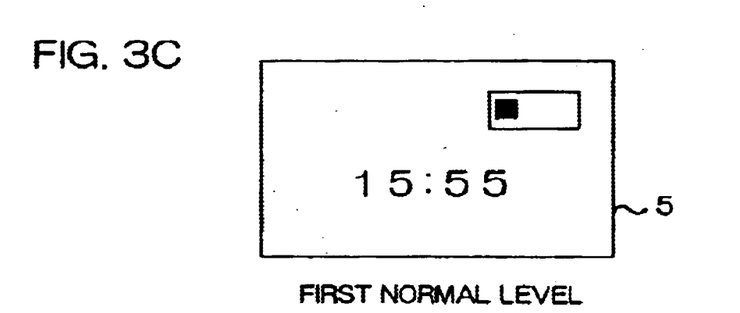
Figure 3D:
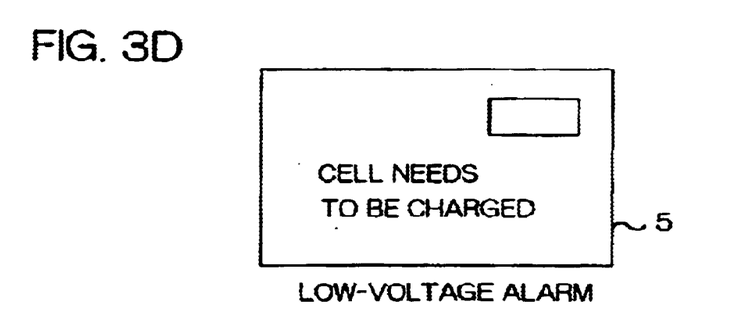

Specifically, if the source voltage is within the third normal level, the controller 3 displays the residual power in the display screen 5 with three solid blocks, as illustrated in FIG. 3A. If the source voltage is within the second normal level, the controller 3 displays the residual power in the display screen 5 with two solid blocks, as illustrated in FIG. 3B. If the source voltage is within the first normal level, the controller 3 displays the residual power in the display screen 5 with one solid block, as illustrated in FIG. 3C. If the source voltage is lower than the lower limit voltage VL, the controller 3 displays the low-voltage alarm "cell needs to be charged" in the display screen 5, as illustrated in FIG. 3D.

Figure 4:
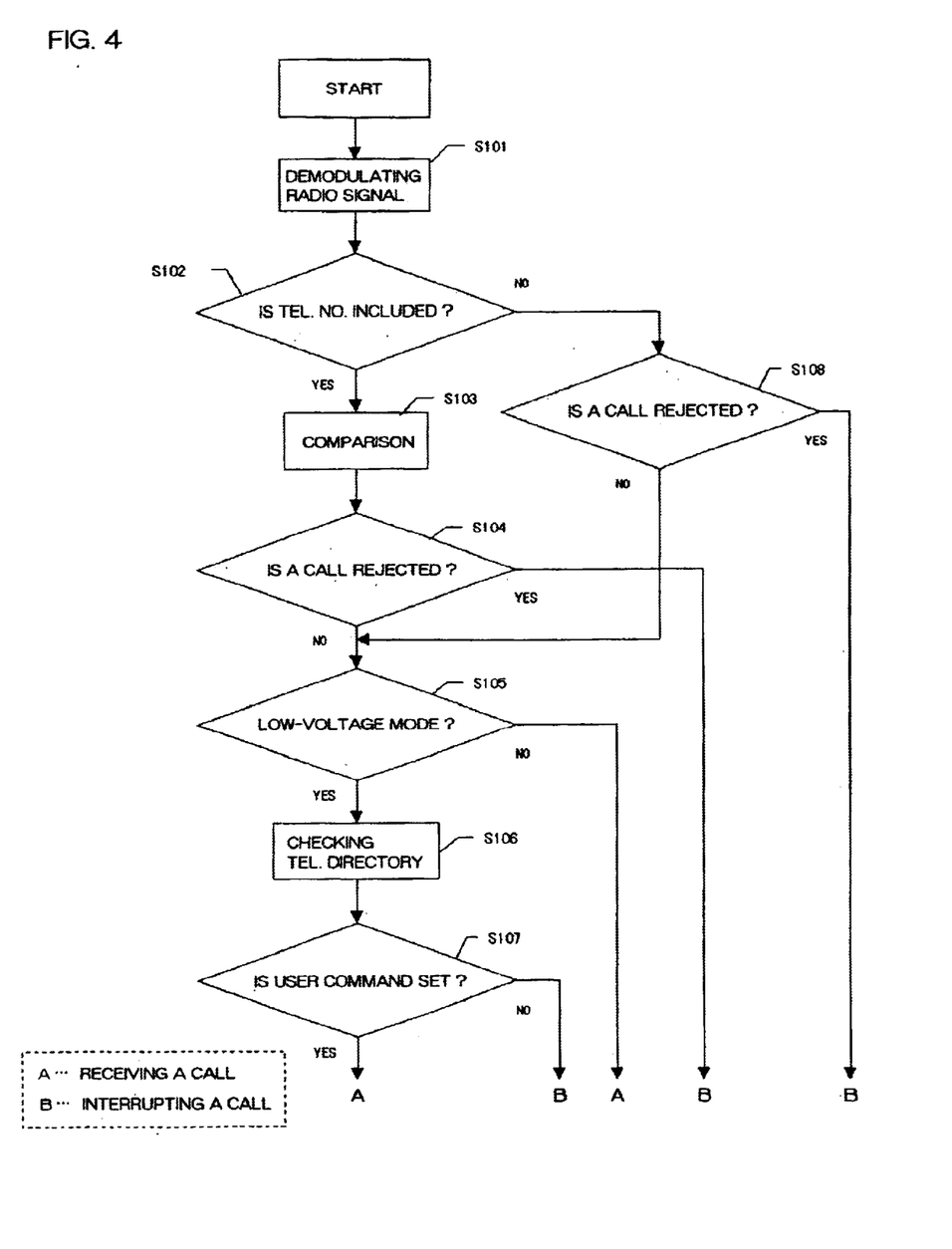
FIG. 4 is a flow chart showing an operation of the mobile telephone in accordance with the first embodiment.

The mobile telephone in accordance with the first embodiment receives a call in line with the flow chart illustrated in FIG. 4.

A high-frequency signal received through the antenna 1 is demodulated in the radio-signal processor 2, and then, is converted into a digital signal in step S101.

Then, the controller 3 checks whether the thus converted digital signal includes data indicative of a telephone number of a call-transmitter, in step S102.

If a telephone number of a call-transmitter is not included in the received radio signal (NO in step S102), the controller 3 checks whether the detected telephone number is designated to be rejected to receive, in step S108.

If the detected telephone number is designated to be rejected to receive (YES in step S108), a call is not received.

If a telephone number of a call-transmitter is included in the received radio signal (YES in step S102), the controller 3 compares the detected telephone number to telephone numbers recorded in the telephone directory stored in the memory 4, in step S103. If the detected telephone number is coincident with one of telephone numbers recorded in the telephone directory, the controller 3 receives a call.

Then, the controller 3 checks whether the detected telephone number is designated to be rejected to receive or not, in step S104.

If the detected telephone number is designated to be rejected to receive (YES in step S104), a call is not received.

If the detected telephone number is not designated to be rejected to receive (NO in steps S104 and S108), the controller 3 checks the mobile telephone is in the low-voltage mode, that is, the source voltage is close to the lower threshold voltage V1, in step S105.

If the mobile telephone is not in the low-voltage mode (NO in step S105), a call is received.

If the mobile telephone is in the low-voltage mode (YES in step S105), the controller 3 checks the telephone directory stored in the memory 4, in step S106.

Then, the controller 3 checks whether a user command is set in the characteristic data associated with the telephone number, in step S107. Herein, a user command means a command to allow the mobile telephone to receive a call even under the low-voltage mode. The user command is set by a user for each of telephone numbers.

If the user command is set in the characteristic data associated with the telephone number (YES in step S107), the controller 3 allows the mobile telephone to receive a call.

To the contrary, if the user command is not set in the characteristic data associated with the telephone number (NO in step S107), the controller 3 does not allow the mobile telephone to receive a call.

Figure 5:
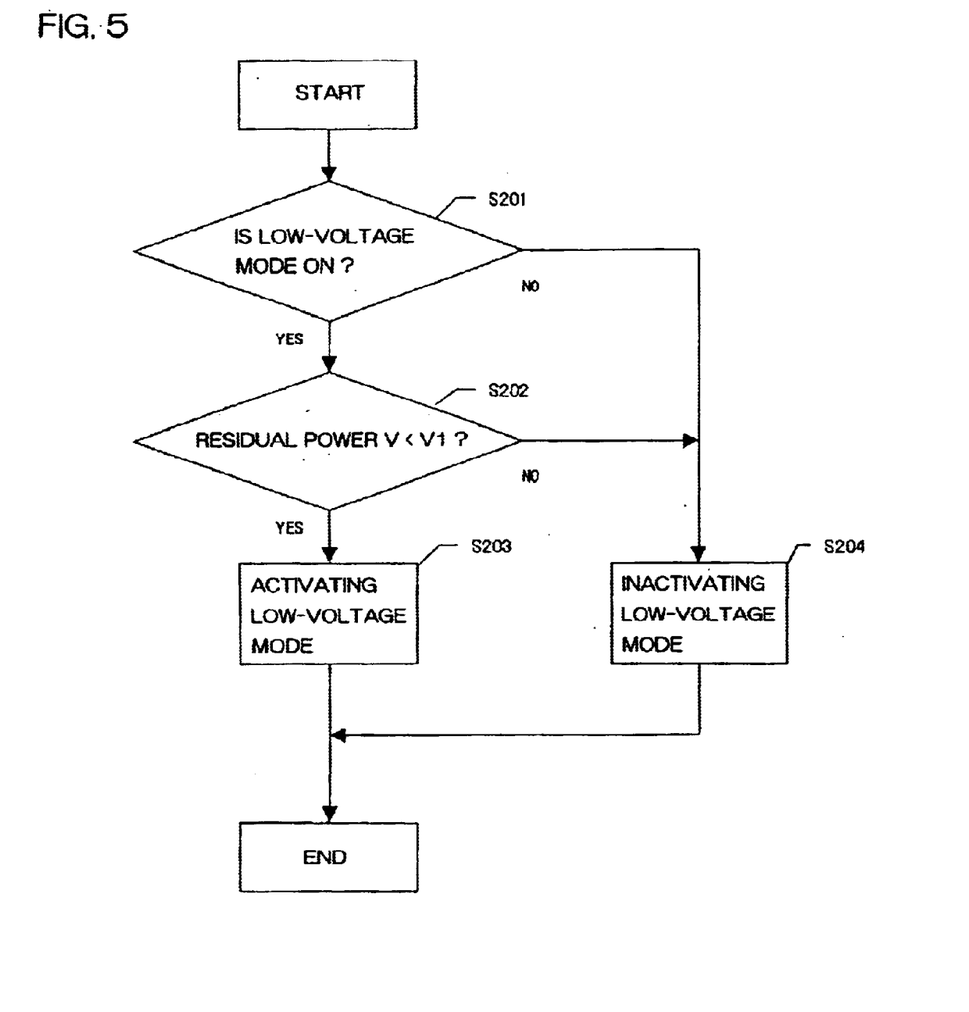
FIG. 5 is a flow chart showing steps of making judgement as to whether a low-voltage mode is to start or not.

The mobile telephone in accordance with the first embodiment is transferred to the low-voltage mode in accordance with the steps in the flow chart illustrated in FIG. 5.

A user can activate or inactive the low-voltage mode in the mobile telephone through the interface 6. The low-voltage mode can be activated only when the source voltage is close to the lower threshold voltage V1. As mentioned earlier, if the mobile telephone is in the low-voltage mode, the mobile telephone is allowed to receive a call associated with predetermined telephone numbers.

With reference to FIG. 5, the controller 3 checks whether the low-voltage mode is set by a user, in step S201. If not (NO in step S201), the controller 3 does not activate the low-voltage mode, regardless of residual power of the power source 7, in step S204.

If the low-voltage mode is set by a user (YES in step S201), the controller 3 checks whether the source voltage is smaller than the threshold voltage V1, in step S202.

If the source voltage is not smaller than the threshold voltage V1 (NO in step S202), the controller 3 does not activate the low-voltage mode, in step S204.

If the source voltage is smaller than the threshold voltage V1 (YES in step S202), the controller 3 activates the low-voltage mode, in step S203.

Herein, the threshold voltage V1 is set greater than the voltage VL at which the low-voltage alarm is to be made. As mentioned earlier with reference to FIG. 2, the threshold voltage V1 is a boundary between the first and second normal levels.

As mentioned so far, in accordance with the first embodiment, data indicative of a telephone number of a call transmitter is detected out of a digital signal demodulated by the radio-signal processor 2 when a call has been received, in the low-voltage mode. The thus detected data is compared to the telephone directory data and the characteristic data, and judgement is made as to whether a call is to be received or not. Hence, even when the source voltage is lowered in the vicinity of the lower threshold voltage, it would be possible to receive a call from a predetermined call-transmitter.

In addition, the first embodiment makes it possible to reject receiving an unnecessary call, that is, a less important call, which ensures that a lifetime of the power source 7 is lengthened, and hence, the mobile telephone is capable of receiving important calls for a long time.

[Second Embodiment]

Figure 6:
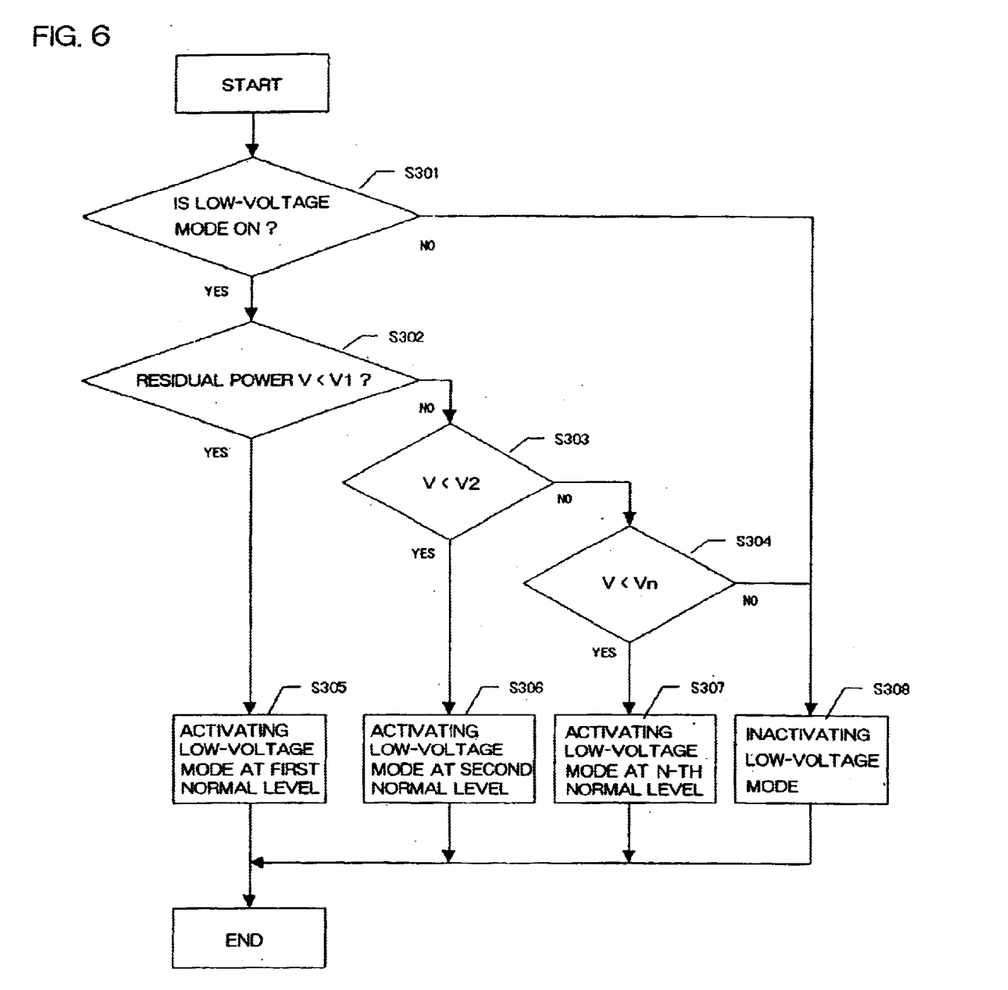
FIG. 6 is a flow chart showing an operation of the mobile telephone in accordance with the second embodiment.

FIG. 6 is a flow chart showing steps to be carried out in an operation of the mobile telephone in accordance with the second embodiment.

In accordance with the second embodiment, there are determined a plurality of threshold voltages. In dependence on reduction in the source voltage, a predetermined group of telephone numbers is selected.

Figure 7:
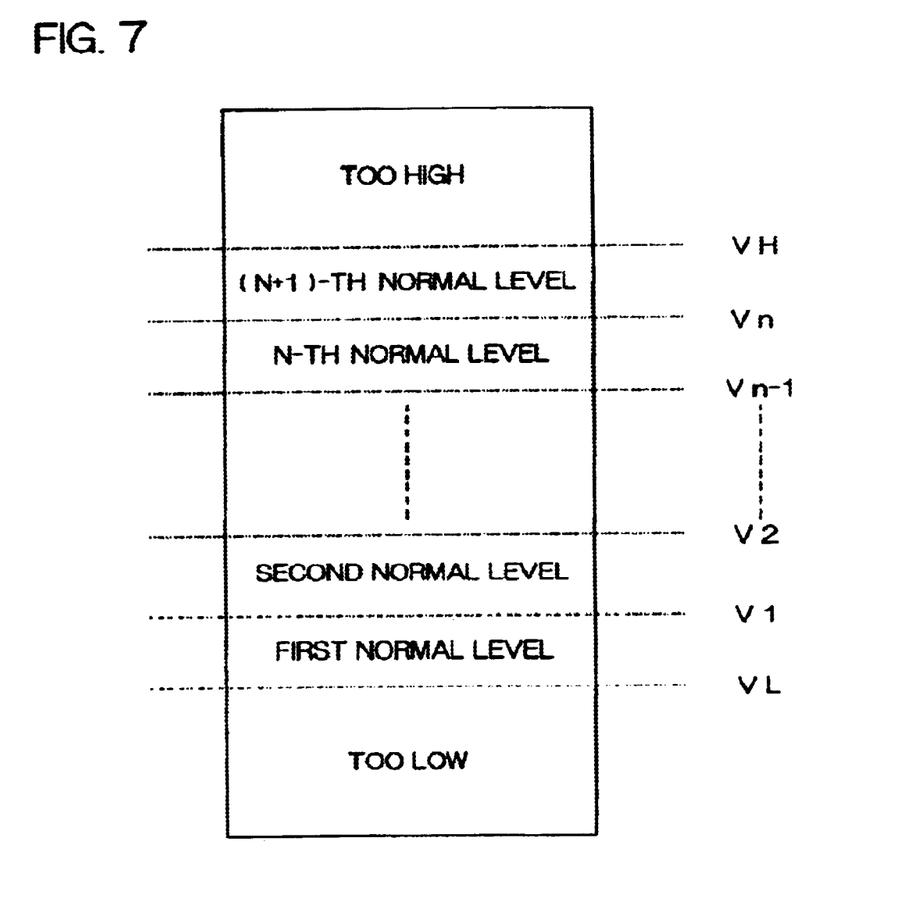
FIG. 7 shows a relation between source voltage levels and threshold voltages.

FIG. 7 shows a relation between the source voltage and threshold voltages.

As mentioned earlier the mobile telephone properly operates at an operational voltage V between the upper and lower limit voltages VL and VH. If the operational voltage V is higher than the upper limit VH (V>VH), the operational voltage is too high, resulting in that the mobile telephone cannot be turned on. If the operational voltage V is lower than the upper limit VL (V<VL), the operational voltage is too low, resulting in that the mobile telephone cannot be turned on.

In the second embodiment, N threshold voltages are in advance determined between the upper and lower limit voltages VH and VL, wherein N is an integer equal to or greater than 2. By determining N threshold voltages V1 to Vn, a range of the operational voltage between the upper and lower limit voltages VH and VL is divided into (n+1) sections. A first section between the voltages VL and V1 defines a first normal level, a second section between the voltages V1 and V2 defines a second normal level, a N-th section between the voltages V(n−1) and Vn defines a N-th normal level, and similarly, a (n+1)-th section between the voltages Vn and VH defines a (n+1)-th normal level.

With reference to FIG. 6, the controller 3 checks whether the low-voltage mode is set by a user, in step S301. If not (NO in step S301), the controller 3 does not activate the low-voltage mode, regardless of residual power of the power source 7, in step S308.

If the low-voltage mode is set by a user (YES in step S301), the controller 3 first checks whether the source voltage is smaller than the first threshold voltage V1, in step S302.

If the source voltage is smaller than the first threshold voltage V1 (YES in step S302), the controller 3 activates the low-voltage mode at the first normal level, in step S305.

If the source voltage is not smaller than the first threshold voltage V1 (NO in step S302), the controller 3 checks whether the source voltage is smaller than the second threshold voltage V2, in step S303.

If the source voltage is smaller than the second threshold voltage V2 (YES in step S303), the controller 3 activates the low-voltage mode at the second normal level, in step S306.

If the source voltage is not smaller than the second threshold voltage V2 (NO in step S303), the controller 3 checks whether the source voltage is smaller than the N-th threshold voltage Vn, in step S304.

If the source voltage is not smaller than the N-th threshold voltage Vn (NO in step S304), the controller 3 does not activate the low-voltage mode, in step S308.

If the source voltage is smaller than the N-th threshold voltage Vn (YES in step S304), the controller 3 activates the low-voltage mode at the N-th normal level, in step S307.

Figure 8:
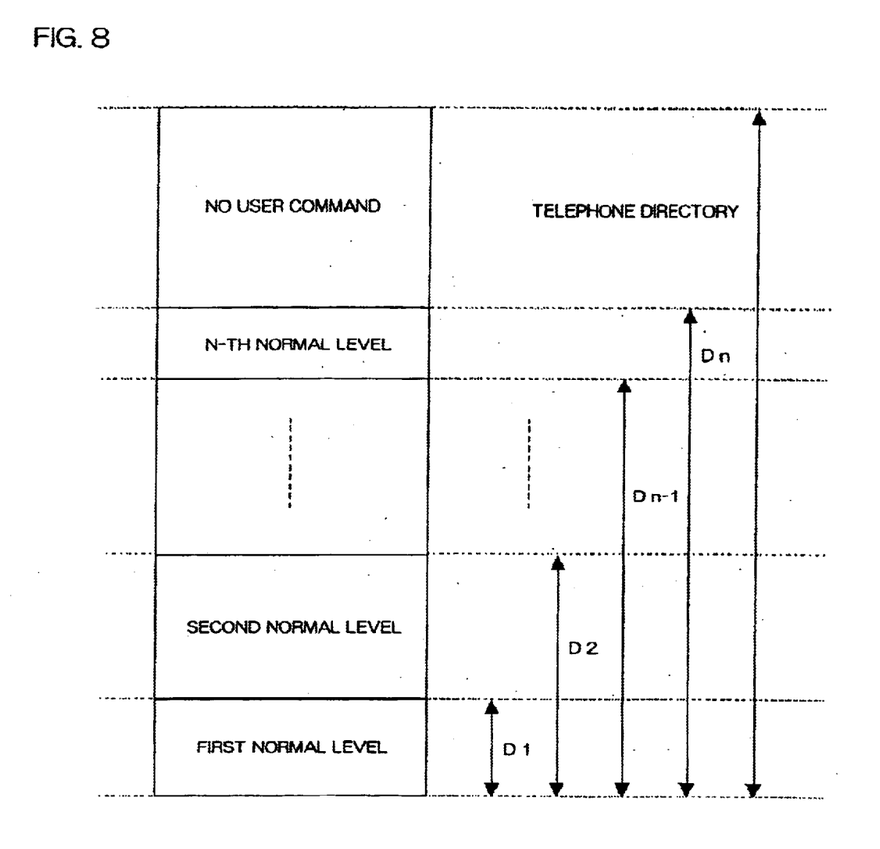
FIG. 8 shows a relation between importance levels and telephone directory data associated therewith.

FIG. 8 shows a relation between the telephone directory data and the first to N-th normal levels.

The telephone directory data is divided into (n+1) sections. Each one of the first to N-th sections in the telephone directory data is associated with each one of the first to N-th normal levels in the operational voltage. The (n+1)-th section in the telephone directory data is not associated with any normal level, that is, the (n+1)-th section in the telephone directory data is associated with a region in which the user command is not established.

With reference to FIG. 8, if the source voltage is within the first normal level, a call associated with the section D1 in the telephone directory data is allowed to receive even in the low-voltage mode. If the source voltage is within the second normal level, a call associated with the section D2 in the telephone directory data is allowed to receive even in the low-voltage mode. Similarly, if the source voltage is within the N-th normal level, that is, if the source voltage is greater than the (n−1)-th threshold voltage, but smaller than the N-th threshold voltage, a call associated with the section DN in the telephone directory data is allowed to receive even in the low-voltage mode.

Thus, since there are determined a plurality of the threshold voltages V1 to Vn in the second embodiment, a range of the telephone directory data can be made greater or smaller in dependence on a degree of the reduction in the source voltage. Specifically, the mobile telephone can receive a call within a smaller range of telephone numbers at the smaller source voltage.

[Third Embodiment]

Figure 9:
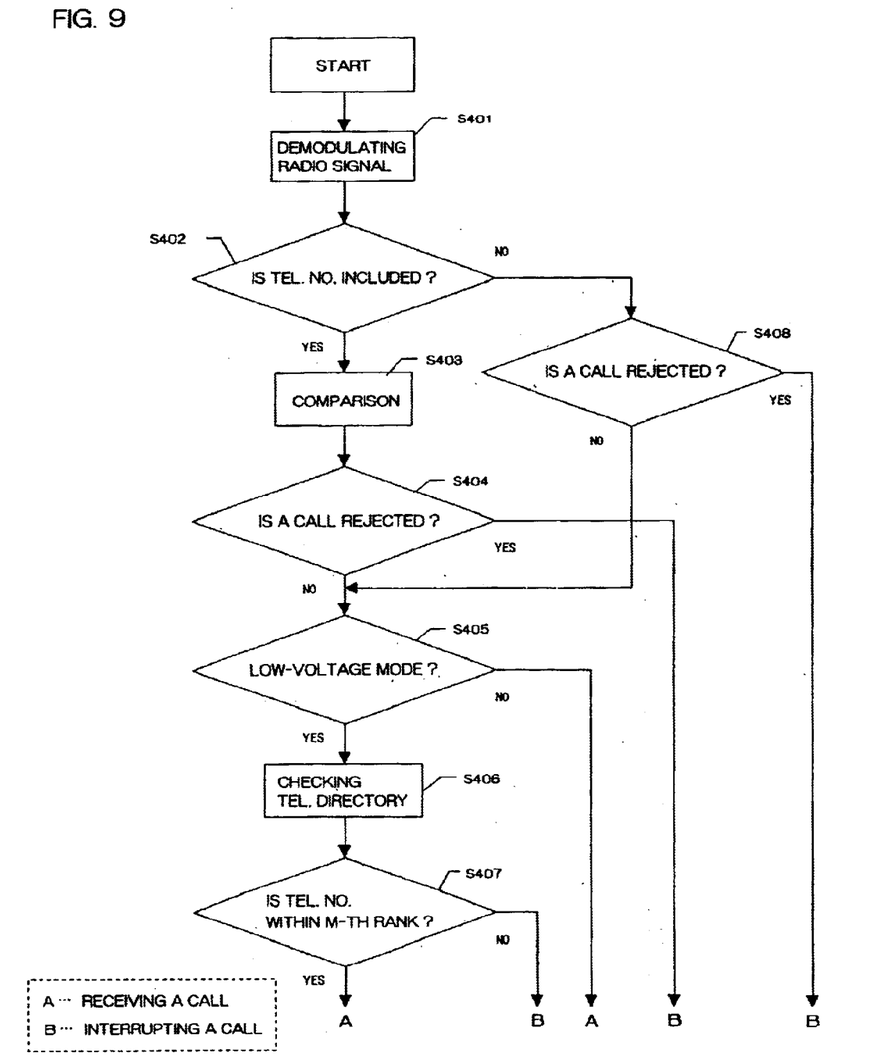
FIG. 9 is a flow chart showing an operation of the mobile telephone in accordance with the third embodiment.

FIG. 9 is a flow chart showing steps to be carried out in an operation of the mobile telephone in accordance with the third embodiment.

In the third embodiment, whether a call is to be received or not is judged based on call-transmitting and call-receiving histories.

With reference to FIG. 9, a high-frequency signal received through the antenna 1 is demodulated in the radio-signal processor 2, and then, is converted into a digital signal, in step S401.

Then, the controller 3 checks whether the thus converted digital signal includes data indicative of a telephone number of a call-transmitter, in step S402.

If a telephone number of a call-transmitter is not included in the received radio signal (NO in step S402), the controller 3 checks whether the detected telephone number is designated to be rejected to receive, in step S408.

If the detected telephone number is designated to be rejected to receive (YES in step S408), a call is not received.

If a telephone number of a call-transmitter is included in the received radio signal (YES in step S402), the controller 3 compares the detected telephone number to telephone numbers recorded in the telephone directory stored in the memory 4, in step S403. If the detected telephone number is coincident with one of telephone numbers recorded in the telephone directory, the controller 3 receives a call.

Then, the controller 3 checks whether the detected telephone number is designated to be rejected to receive or not, in step S404.

If the detected telephone number is designated to be rejected to receive (YES in step S404), a call is not received.

If the detected telephone number is not designated to be rejected to receive (NO in steps S404 and S408), the controller 3 checks the mobile telephone is in the low-voltage mode, in step S405.

If the mobile telephone is not in the low-voltage mode (NO in step S405), a call is received.

If the mobile telephone is in the low-voltage mode (YES in step S405), the controller 3 checks the telephone directory stored in the memory 4, in step S406.

Then, the controller 3 checks whether a frequency of call-transmitting and call-receiving in the telephone number in question is within first to M-th rank, in step S407. Herein, M is an integer which a user can randomly select among integers greater than 2.

Then, the controller 3 counts the number A of call-transmitting and the number B of call-receiving in the telephone number in question, and calculates count data X defined by the following equation.

X=SA+RB

In the equation, S and R are weight coefficients. Each of the telephone numbers recorded in the telephone directory has its own count data X as one of the characteristic data.

The controller 3 in advance calculates the count data X in each of the telephone numbers recorded in the telephone directory. The controller 3 sorts such count data X, and stores them in the order in a data table incorporated in the memory 4.

When the mobile telephone is in the low-voltage mode, the controller 3 allows to receive a call, if a telephone number associated with the call is within the first to M-th order in the data table (YES in step S407).

To the contrary, if a telephone number associated with the call is not within the first to M-th order in the data table (NO in step S407), the controller 3 does not allow to receive a call.

In accordance with the third embodiment, since call-transmitting and call-receiving histories are stored in the memory 4 as characteristic data for each one of the telephone numbers recorded in the telephone directory, it would be possible to receive only a call associated with a telephone number having a high frequency in call-transmitting and call-receiving. In other words, it is possible to allow the mobile telephone to receive a call in the low-voltage mode in dependence on a frequency of call-transmitting and call-receiving.

[Fourth Embodiment]

Figure 10:
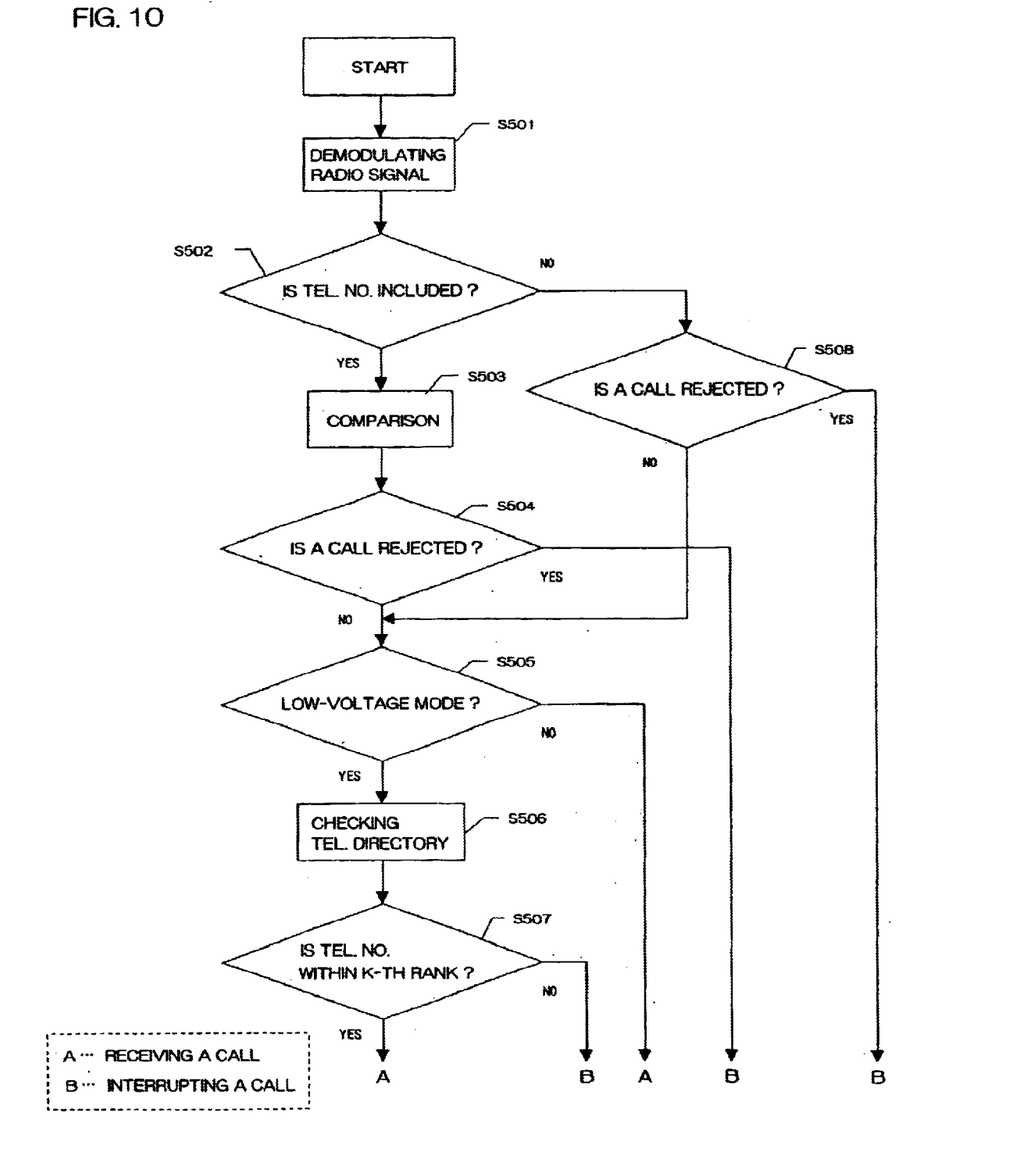
FIG. 10 is a flow chart showing an operation of the mobile telephone in accordance with the fourth embodiment.

FIG. 10 is a flow chart showing steps to be carried out in an operation of the mobile telephone in accordance with the fourth embodiment.

In the fourth embodiment, whether a call is to be received or not is judged based on a total period of time of past communication.

With reference to FIG. 10, a high-frequency signal received through the antenna 1 is demodulated in the radio-signal processor 2, and then, is converted into a digital signal, in step S501.

Then, the controller 3 checks whether the thus converted digital signal includes data indicative of a telephone number of a call-transmitter, in step S502.

If a telephone number of a call-transmitter is not included in the received radio signal (NO in step S502), the controller 3 checks whether the detected telephone number is designated to be rejected to receive, in step S508.

If the detected telephone number is designated to be rejected to receive (YES in step S508), a call is not received.

If a telephone number of a call-transmitter is included in the received radio signal (YES in step S502), the controller 3 compares the detected telephone number to telephone numbers recorded in the telephone directory stored in the memory 4, in step S503. If the detected telephone number is coincident with one of telephone numbers recorded in the telephone directory, the controller 3 receives a call.

Then, the controller 3 checks whether the detected telephone number is designated to be rejected to receive or not, in step S504.

If the detected telephone number is designated to be rejected to receive (YES in step S504), a call is not received.

If the detected telephone number is not designated to be rejected to receive (NO in steps S504 and S508), the controller 3 checks the mobile telephone is in the low-voltage mode, in step S505.

If the mobile telephone is not in the low-voltage mode (NO in step S505), a call is received.

If the mobile telephone is in the low-voltage mode (YES in step S505), the controller 3 checks the telephone directory stored in the memory 4, in step S506.

Then, the controller 3 checks whether a total period of time in past call-transmitting and call-receiving in the telephone number in question is within first to K-th rank, in step S507. Herein, K is an integer which a user can randomly select among integers greater than 2.

Then, the controller 3 counts a total period of time in past call-transmitting and call-receiving in the telephone number in question.

The controller 3 in advance calculates a total period of time in call-transmitting and call-receiving in each of the telephone numbers recorded in the telephone directory. The controller 3 sorts such total period of times, and stores them in the order in a data table incorporated in the memory 4. That is, all of the telephone numbers recorded in the telephone directory has its own total period of time in past call-transmitting and call-receiving as one of characteristic data.

When the mobile telephone is in the low-voltage mode, the controller 3 allows to receive a call, if a telephone number associated with the call is within the first to K-th order in the data table (YES in step S507).

To the contrary, if a telephone number associated with the call is not within the first to K-th order in the data table (NO in step S507), the controller 3 does not allow to receive a call.

In accordance with the fourth embodiment, since a total period of time in past call-transmitting and call-receiving is stored in the memory 4 as characteristic data for each one of the telephone numbers recorded in the telephone directory, it would be possible to receive only a call associated with a telephone number having a high frequency in call-transmitting and call-receiving. In other words, it is possible to allow the mobile telephone to receive a call in the low-voltage mode in dependence on a total period of time in communication.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-136828 filed on May 18, 1999 including specification, claims, drawings and summary is incorporated herein by reference in its entirety.

What is claimed is:

1. A mobile telephone comprising:

(a) an antenna receiving radio signals;

(b) a display screen;

(c) a voltage source;

(d) a memory storing telephone numbers therein; and (e) a controller detecting a telephone number out of a radio signal received through said antenna, comparing the thus detected telephone number to said telephone numbers stored in said memory, and determining whether a call associated with the detected telephone number is to be received, even when a voltage supplied by said voltage source is equal to or lower than a predetermined threshold voltage;

wherein said controller receives a call, when said call is of one of predetermined telephone numbers, even if a voltage supplied by said voltage source is equal to or lower than a predetermined threshold voltage.

2. The mobile telephone as set forth in claim 1, wherein said controller detects a voltage supplied by said voltage source at an every predetermined period of time, and displays a present voltage in said display screen.

3. The mobile telephone as set forth in claim 1, wherein said controller includes first to N-th predetermined threshold voltages to each of which a telephone number detected out of a received radio signal is compared, wherein N is an integer equal to or greater than 2, said memory storing N groups of telephone numbers in association with each of said first to N-th predetermined threshold voltages, said controller receiving a call, if a voltage supplied from said voltage source is equal to or smaller than the M-th predetermined threshold voltage and a telephone number detected out of a received radio signal belongs to M-th group of telephone numbers, wherein M is an integer between 1 and N both inclusive ($1 \leq M \leq N$).

4. The mobile telephone as set forth in claim 1, wherein said memory stores the numbers of call-receiving and call-transmitting, and said controller determines whether a call associated with the telephone number detected out of a received radio signal is to be received, based on at least one of said numbers of call-receiving and call-transmitting.

5. The mobile telephone as set forth in claim 4, wherein said memory stores a count X defined by the following equation:

$$X = S \times A + R \times B$$

wherein A indicates the number of call-receiving, B indicates the number of call-transmitting, and S and R are weight coefficients, said controller determines whether a call associated with the telephone number detected out of a received radio signal is to be received, based on said count X.

6. The mobile telephone as set forth in claim 1, wherein said memory stores a total period of time during which a call is received or made, for each one of telephone numbers stored therein, and said controller determines whether a call associated with the telephone number detected out of a received radio signal is to be received, based on said total period of time.

7. A mobile telephone comprising:

(a) an antenna receiving radio signals;

(b) a display screen;

(c) a voltage source;

(d) a memory storing telephone numbers therein;

(e) an interface through which an operator can set a low-voltage mode in which said mobile telephone is allowed to receive a call associated with predetermined telephone numbers, even if a voltage supplied by said voltage source is equal to or lower than a predetermined threshold voltage; and (f) a controller detecting a telephone number out of a radio signal received through said antenna, comparing the thus detected telephone number to said telephone numbers stored in said memory, and determining whether a call associated with the detected telephone number is to be received, when said mobile telephone is set in said low-voltage mode.

8. The mobile telephone as set forth in claim 7, wherein said low-voltage mode is set only when a voltage supplied by said voltage source is equal to or lower than said predetermined threshold voltage.

9. The mobile telephone as set forth in claim 7, wherein said controller detects a voltage supplied by said voltage source at an every predetermined period of time, and displays a present voltage in said display screen.

10. The mobile telephone as set forth in claim 7, wherein said controller receives a call, if said call is of one of said predetermined telephone numbers.

11. The mobile telephone as set forth in claim 7, wherein said controller includes first to N-th predetermined threshold voltages to each of which a telephone number detected out of a received radio signal is compared, wherein N is an integer equal to or greater than 2, said memory storing N groups of telephone numbers in association with each of said first to N-th predetermined threshold voltages, said controller receiving a call, if a voltage supplied from said voltage source is equal to or smaller than the M-th predetermined threshold voltage and a telephone number detected out of a received radio signal belongs to M-th group of telephone numbers, wherein M is an integer between 1 and N both inclusive ($1 \leq M \leq N$).

12. The mobile telephone as set forth in claim 7, wherein said memory stores the numbers of call-receiving and call-transmitting, and said controller determines whether a call associated with the telephone number detected out of a received radio signal is to be received, based on at least one of said numbers of call-receiving and call-transmitting.

13. The mobile telephone as set forth in claim 12, wherein said memory stores a count X defined by the following equation:

$$X = S \times A + R \times B$$

wherein A indicates the number of call-receiving, B indicates the number of call-transmitting, and S and R are weight coefficients, said controller determines whether a call associated with the telephone number detected out of a received radio signal is to be received, based on said count X.

14. The mobile telephone as set forth in claim 7, wherein said memory stores a total period of time during which a call is received or made, for each one of telephone numbers stored therein, and said controller determines whether a call associated with the telephone number detected out of a received radio signal is to be received, based on said total period of time.

15. A method of operating a mobile telephone, comprising the steps of:

(a) receiving radio signals through an antenna;

(b) storing telephone numbers;

(c) detecting a telephone number out of a radio signal received through said antenna;

(d) comparing the thus detected telephone number to said stored telephone numbers; and (e) determining whether a call associated with the detected telephone number is to be received, even when a voltage supplied by a voltage source is equal to or lower than a predetermined threshold voltage, and receiving a call, when said call is of one of said stored telephone numbers, even if a voltage supplied by said voltage source is equal to or lower than a predetermined threshold voltage.

16. The method as set forth in claim 15, further comprising the steps of:

(f) detecting a voltage supplied by said voltage source at an every predetermined period of time; and (g) displaying a present voltage in a display screen.

17. The method as set forth in claim 15, wherein said step (d) includes the step of comparing each of first to N-th predetermined threshold voltages to a telephone number detected out of a received radio signal, wherein N is an integer equal to or greater than 2, and further comprising the step of receiving a call, if a voltage supplied from said voltage source is equal to or smaller than a M-th predetermined threshold voltage and a telephone number detected out of a received radio signal belongs to said M-th group of telephone numbers, N groups of telephone numbers being in association with each of said first to N-th predetermined threshold voltages, wherein M is an integer between 1 and N both inclusive ($1 \leq M \leq N$).

18. The method as set forth in claim 15, further comprising the step of storing the numbers of call-receiving and call-transmitting, and wherein a call associated with the telephone number detected out of a received radio signal is determined in said step (e) to be received or not, based on at least one of said numbers of call-receiving and call-transmitting.

19. The method as set forth in claim 18, wherein a call associated with the telephone number detected out of a received radio signal is determined in said step (e) to be received or not, based on a count X defined by the following equation:

$$X = S \times A + R \times B$$

wherein A indicates the number of call-receiving, B indicates the number of call-transmitting, and S and R are weight coefficients.

20. The method as set forth in claim 15, further comprising the step of storing a total period of time during which a call is received or made, for each one of telephone numbers stored therein, and wherein a call associated with the telephone number detected out of a received radio signal is determined in said step (e) to be received or not, based on said total period of time.

21. A method of operating a mobile telephone, comprising the steps of:

(a) receiving radio signals through an antenna;

(b) storing telephone numbers;

(c) setting said mobile telephone in a low-voltage mode in which said mobile telephone is allowed to receive a call associated with said stored telephone numbers, even if a voltage supplied by said voltage source is equal to or lower than a predetermined threshold voltage;

(d) detecting a telephone number out of a radio signal received through said antenna;

(e) comparing the thus detected telephone number to said stored telephone numbers; and (f) determining whether a call associated with the detected telephone number is to be received, when said mobile telephone is set in said low-voltage mode.

22. The method as set forth in claim 21, wherein said low-voltage mode is set in said step (c) only when a voltage supplied by said voltage source is equal to or lower than said predetermined threshold voltage.

23. The method as set forth in claim 21, further comprising the steps of:

(g) detecting a voltage supplied by said voltage source at an every predetermined period of time; and (h) displaying a present voltage in a display screen.

24. The method as set forth in claim 21, further comprising the step of receiving a call, when said call is of one of said stored telephone numbers, even if a voltage supplied by said voltage source is equal to or lower than a predetermined threshold voltage.

25. The method as set forth in claim 21, wherein said step (e) includes the step of comparing each of first to N-th predetermined threshold voltages to a telephone number detected out of a received radio signal, wherein N is an integer equal to or greater than 2, and further comprising the step of receiving a call, if a voltage supplied from said voltage source is equal to or smaller than a M-th predetermined threshold voltage and a telephone number detected out of a received radio signal belongs to said M-th group of telephone numbers, N groups of telephone numbers being in association with each of said first to N-th predetermined threshold voltages, wherein M is an integer between 1 and N both inclusive ($1 \leq M \leq N$).

26. The method as set forth in claim 21, further comprising the step of storing the numbers of call-receiving and call-transmitting, and wherein a call associated with the telephone number detected out of a received radio signal is determined in said step (f) to be received or not, based on at least one of said numbers of call-receiving and call-transmitting.

27. The method as set forth in claim 26, wherein a call associated with the telephone number detected out of a received radio signal is determined in said step (f) to be received or not, based on a count X defined by the following equation:

$$X = S \times A + R \times B$$

wherein A indicates the number of call-receiving, B indicates the number of call-transmitting, and S and R are weight coefficients.

28. The method as set forth in claim 21, further comprising the step of storing a total period of time during which a call is received or made, for each one of telephone numbers stored therein, and wherein a call associated with the telephone number detected out of a received radio signal is determined in said step (f) to be received or not, based on said total period of time.

* * * * *